United States Patent
Dindar et al.

(10) Patent No.: US 11,686,254 B1
(45) Date of Patent: Jun. 27, 2023

(54) GEARBOX ASSEMBLY

(71) Applicant: General Electric Company, Schenectady, NY (US)

(72) Inventors: Ahmet Dindar, Albany, NY (US); Kedar S. Vaidya, Albany, NY (US); Bugra H. Ertas, Niskayuna, NY (US); Arthur W. Sibbach, Boxford, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/812,309

(22) Filed: Jul. 13, 2022

(51) Int. Cl.
*F02C 7/36* (2006.01)
*F16H 57/08* (2006.01)
*F16H 1/28* (2006.01)

(52) U.S. Cl.
CPC ............... *F02C 7/36* (2013.01); *F16H 1/28* (2013.01); *F16H 57/082* (2013.01); *F05D 2260/40311* (2013.01); *F16H 2057/085* (2013.01)

(58) Field of Classification Search
CPC ...... F02C 7/36; F02C 7/06; F02C 7/32; F16H 1/28; F16H 57/082; F16H 2057/085; F16H 57/08; F16H 1/2836; F16H 57/0479; F05D 2260/40311; F01D 25/16
See application file for complete search history.

(56) References Cited

U.S. PATENT DOCUMENTS

| | | | |
|---|---|---|---|
| 9,518,648 B2 | 12/2016 | Carlino et al. | |
| 9,593,763 B2 | 3/2017 | Kurth et al. | |
| 9,964,202 B2 | 5/2018 | Macik | |
| 10,995,676 B2 | 5/2021 | Kallianteris et al. | |
| 2009/0270216 A1* | 10/2009 | Poon | F16H 1/2836 475/178 |
| 2010/0331140 A1* | 12/2010 | McCune | F02C 7/06 475/331 |
| 2016/0319928 A1 | 11/2016 | Van Eyndhoven | |
| 2020/0088104 A1* | 3/2020 | Kallianteris | F16H 57/082 |
| 2020/0200236 A1 | 6/2020 | Wüstenberg | |
| 2021/0404547 A1 | 12/2021 | Bianchi et al. | |

FOREIGN PATENT DOCUMENTS

| | | |
|---|---|---|
| CN | 109114200 A | 1/2019 |
| EP | 2855859 B1 | 1/2019 |
| WO | WO-2021073984 A1 * | 4/2021 |

* cited by examiner

*Primary Examiner* — Richard W Ridley
*Assistant Examiner* — Aimee Tran Nguyen
(74) *Attorney, Agent, or Firm* — Venable LLP; Peter T. Hrubiec; Michele V. Frank

(57) ABSTRACT

A gearbox assembly for a turbine engine. The turbine engine includes a drive shaft and a fan shaft. The gearbox assembly includes a first gear, a second gear, an output, and a journal pin. The first gear is connected to the drive shaft. The second gear is supported by a planet carrier. The output is connected to the fan shaft. Torque is transferred from the drive shaft of the core turbine engine to the fan shaft through the gearbox assembly. The journal pin is inserted into the planet carrier. The second gear rotates about the journal pin. A coupling of the journal pin and the planet carrier is characterized by an interference ratio greater than a minimum interference ratio of 1.0e-5.

20 Claims, 7 Drawing Sheets

GEARBOX ASSEMBLY

TECHNICAL FIELD

The present disclosure relates generally to gearbox assemblies for turbine engines.

BACKGROUND

A turbine engine generally includes a fan and a core section arranged in flow communication with one another. A gearbox assembly is coupled between the fan and the core section.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
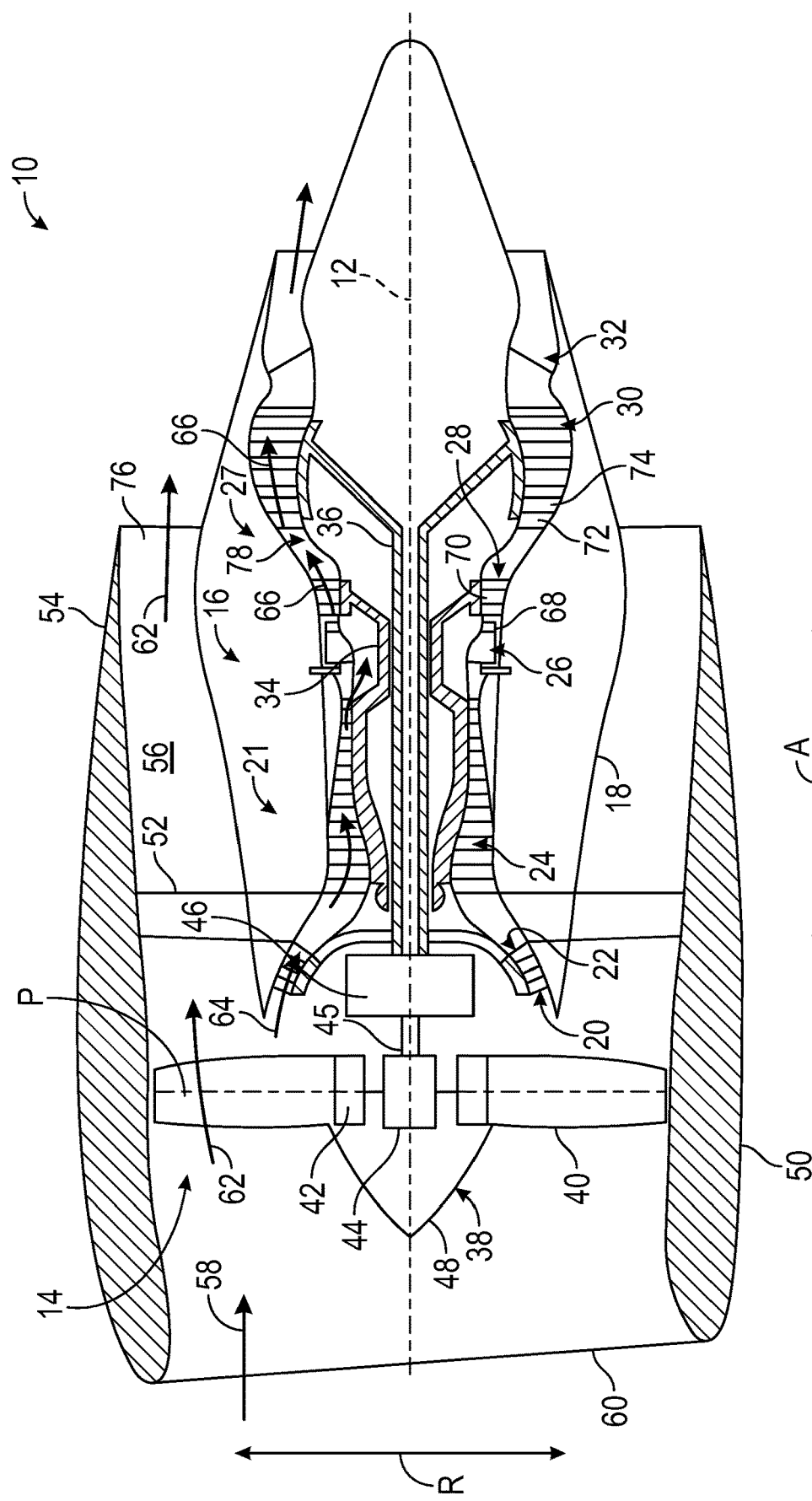
FIG. 1 is a schematic cross-sectional diagram of a turbine engine, taken along a centerline axis of the turbine engine, according to an embodiment of the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below.

While specific embodiments are discussed, this is done for illustration purposes only. A person skilled in the relevant art will recognize that other components and configurations may be used without departing from the spirit and the scope of the present disclosure.

As used herein, the terms "first," and "second," may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the term "axial" refers to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, an "interference fit" is a coupling between two tight fitting mating components in which an inner component is inserted into an outer component that produces a joint which is held together by friction after the components are coupled together.

As used herein, "diametral interference" is a difference between an outer diameter of the inner component and an inner diameter of the outer component in an interference fit.

As used herein, "plastic deformation" is the permanent distortion that occurs when a material is subjected to tensile, compressive, bending, or torsion stresses that exceed a yield strength of the material and cause the material to elongate, compress, buckle, bend, or twist.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A turbine engine can be configured as a geared engine. Geared engines include a power gearbox utilized to transfer power from a turbine shaft to a main fan. Such gearboxes may include a sun gear, a plurality of planet gear, and a ring gear. The sun gear meshes with the plurality of planet gears and the plurality of planet gears mesh with the ring gear. In operation, the gearbox transfers the torque transmitted from the turbine shaft operating at a first speed to a fan shaft rotating at a second, lower speed. For a planetary configuration of the gearbox, the sun gear may be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft. In either configuration, the planet gears rotate about a journal pin in which a journal bearing is formed between the journal pin and the planet gears. The journal pin is inserted through the planet carrier and is typically fixed to the planet carrier by an interference fit.

The interference fit of the journal pin must be tight enough to resist frictional torques on the journal pin due to the torques transmitted through the gears of the gearbox. As a result, if the interference fit is not tight enough, slippage can occur between the journal pin and the planet carrier. Such slippage of the journal pin can reduce the overall efficiency and power output of the gearbox. If the interference fit is too great, however, plastic deformation of the journal pin or the planet carrier can occur.

As engines increase in power and thrust, the torques described become more challenging to accommodate while assuring a sufficient interference fit of the journal pin in the planet carrier of the gearbox. The inventors, seeking a need to improve upon the existing interference fit of the journal pin for power gearboxes, designed several different configurations of the interference fit between the journal pin and the planet carrier to arrive at an improved design, better suited to handle the torques on the journal pin for different architectures, thereby improving efficiency and power output of a gearbox.

Referring now to the drawings, FIG. 1 is a schematic cross-sectional diagram of a turbine engine 10, taken along a centerline axis of the turbine engine 10, according to an embodiment of the present disclosure. FIG. 1 shows the turbine engine 10 defines an axial direction A (extending parallel to a longitudinal centerline 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline 12 via a fan shaft 45 that is powered by the LP shaft 36 across a power gearbox 46, also referred to as a gearbox assembly 46. The gearbox assembly 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as the second portion of air 64 is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate. This thereby supports operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it should be appreciated that, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 2:
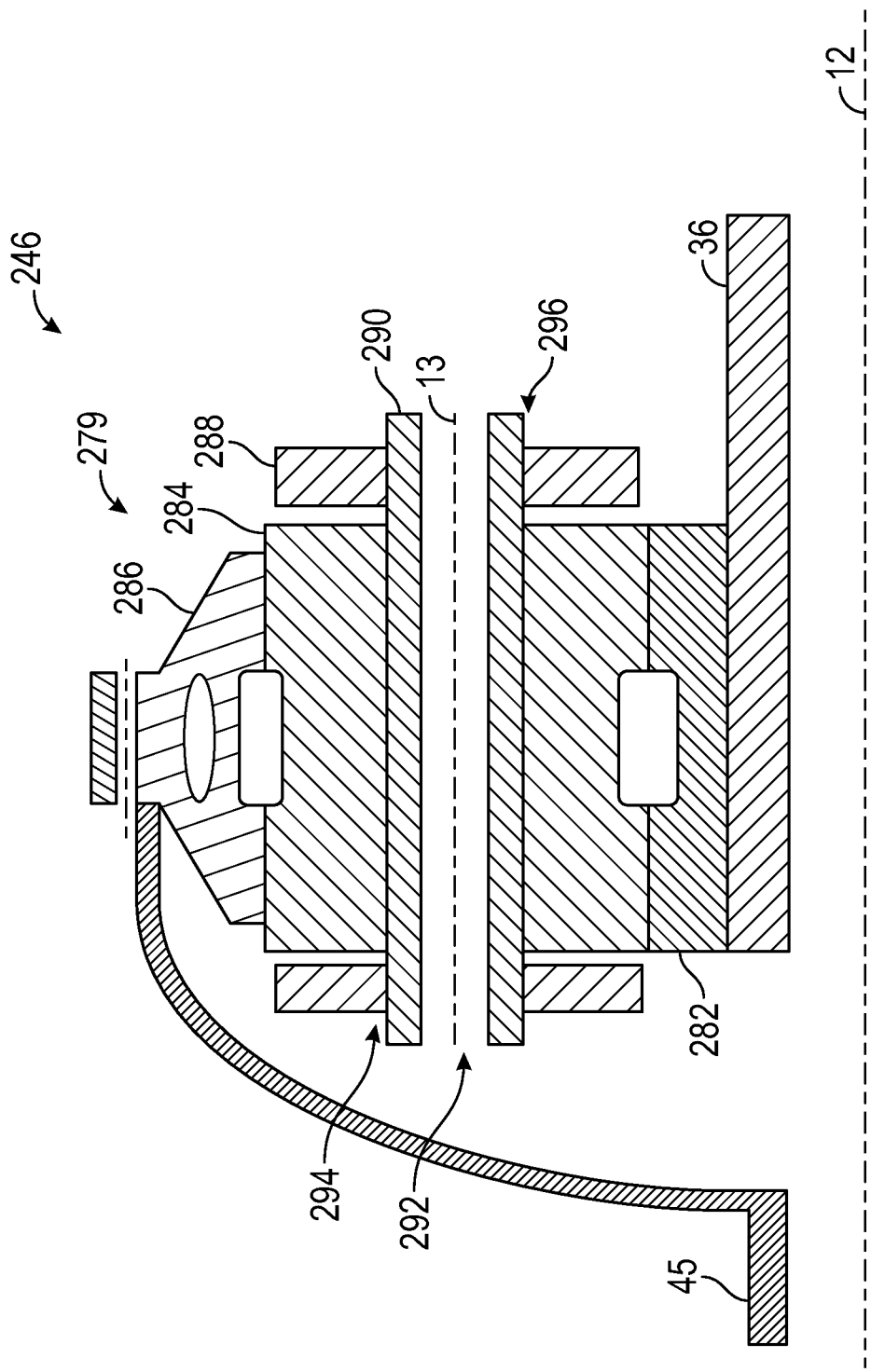
FIG. 2 is a schematic, cross-sectional side view of a gearbox assembly for a turbine engine, according to an embodiment of the present disclosure.

FIG. 2 is a schematic, cross-sectional side view of a gearbox assembly 246, according to an embodiment of the present disclosure. The gearbox assembly 246 may be employed in the turbine engine 10 of FIG. 1. That is, the gearbox assembly 246 couples the LP shaft 36 to the fan 38 (FIG. 1).

The gearbox assembly 246 includes an epicyclic gear assembly 279 including a sun gear 282, a plurality of planet gears 284 (only one of which is visible in FIG. 2), and a ring gear 286. For clarity, only a portion of the gears is shown. Although not depicted in FIG. 2, each of the sun gear 282, the plurality of planet gears 284, and the ring gear 286 comprises teeth about their periphery to intermesh with the other gears. The gearbox assembly 246 is a star type or a rotating ring gear type gearbox assembly (e.g., the ring gear 286 is rotating and a planet carrier 288 is fixed and stationary). In such an arrangement, the fan 38 is driven by the ring gear 286. In this way, the ring gear 286 is an output of the gearbox assembly 246. However, other suitable type of gearbox assembly 246 may be employed. In one non-limiting example, the gearbox assembly 246 may be a planetary arrangement, in which the ring gear 286 is held fixed, and the planet carrier 288 is allowed to rotate. In such an arrangement, the fan 38 is driven by the planet carrier 288. In this way, the planet carrier 288 is the output of the gearbox assembly 246. In another non-limiting example, the gearbox assembly 246 may be a differential gearbox in which the ring gear 286 and the planet carrier 288 are both allowed to rotate.

A drive shaft (e.g., the LP shaft 36) is coupled to the sun gear 282. In this way, the sun gear 282 is an input of the gearbox assembly 246. In some examples, the drive shaft is the HP shaft 34 (FIG. 1). Radially outward of the sun gear 282, and intermeshing therewith, is the plurality of planet gears 284 that are coupled together and supported by the planet carrier 288. The planet carrier 288 supports and constrains the plurality of planet gears 284 such that the plurality of planet gears 284 do not together rotate around the sun gear 282 while enabling each planet gear of the plurality of planet gears 284 to rotate about its own axis 13. Radially outwardly of the plurality of planet gears 284, and intermeshing therewith, is the ring gear 286, which is an annular ring gear. The ring gear 286 is coupled via the fan shaft 45 to the fan 38 (FIG. 1) and rotates to drive rotation of the fan 38 (FIG. 1) about the longitudinal centerline 12. In this way, the ring gear 286 is an output of the gearbox assembly 246. In the planetary configuration, the planet carrier 288 is the output of the gearbox assembly 246.

Each of the planet gears 284 of the plurality of planet gears 284 includes a journal pin 290 about which a respective planet gear 284 rotates. For example, lubricant (e.g., oil) is provided between the journal pin 290 and a respective planet gear 284 such that the planet gear 284 rotates with respect to the journal pin 290. The gearbox assembly 246 includes a gear ratio that defines a ratio of the speed of the input gear (e.g., the sun gear 282) to the speed of the output (e.g., the ring gear 286) through the gearbox assembly 246. In the planetary configuration, the output is the planet carrier 288).

The journal pin 290 includes an internal bore 292 defined therethrough along the axis 13. The lubrication is provided to the internal bore 292 such that the journal pin 290 delivers the lubricant between the journal pin 290 and the respective planet gear 284. The journal pin 290 is inserted through a first aperture 294 and a second aperture 296 of the planet carrier 288. In this way, the journal pin 290 is fixed to the planet carrier 288 by an interference fit at the first aperture 294 and the second aperture 296, as detailed further below.

Figure 3:
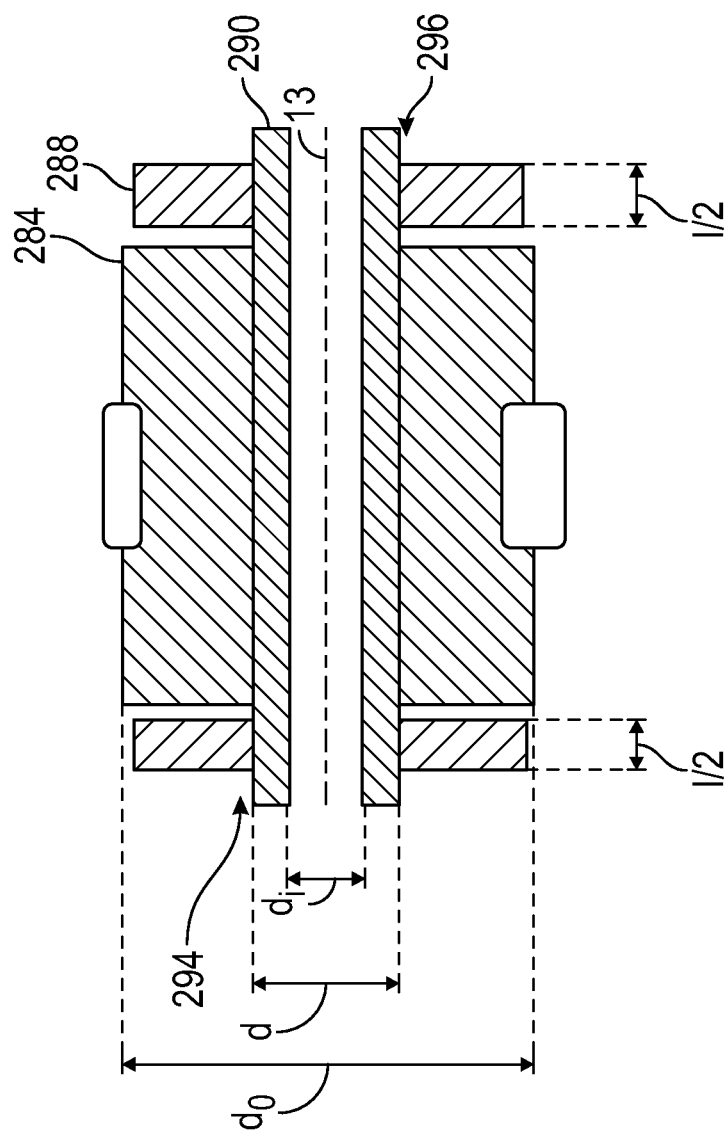
FIG. 3 is a schematic, cross-sectional side view of a portion of the gearbox assembly of FIG. 2, according to an embodiment of the present disclosure.

FIG. 3 is a schematic, cross-sectional side view of a portion of the gearbox assembly 246, according to an embodiment of the present disclosure. FIG. 3 illustrates the planet gear 284, the planet carrier 288, and the journal pin 290 isolated from the gearbox assembly 246. FIG. 3 shows the journal pin 290 inner diameter $d_i$ and outer diameter d. The inner diameter $d_i$ is defined as a diameter of the internal bore 292. The outer diameter d is defined as a diameter of an outer surface of the journal pin 290. The planet gear 284 includes a root diameter do. The root diameter do is a diameter of a circle around a bottom (e.g., the root) of the gear tooth spaces of the planet gear 284. The root diameter do is the diameter of a circle tracing the surfaces of troughs or valleys equidistant from the adjacent peaks or crests of gear teeth.

The journal pin 290 is inserted into the planet carrier 288 and fixed in place by an interference fit. The outer diameter d is slightly larger than the inner diameter of the planet carrier 288 prior to the journal pin 290 being inserted into the first aperture 294 and into the second aperture 296. The inner diameter of the planet carrier 288 is a diameter of the first aperture 294 and a diameter of the second aperture 296. When the journal pin 290 is inserted into the planet carrier 288, the outer diameter d of the journal pin 290 and the inner diameter of the planet carrier 288 become the same. Thus, the outer diameter d also represents the inner diameter of the planet carrier 288 in FIG. 3. A length 1 of the interference fit is defined as an axial length of the contact between the journal pin 290 and the inner diameter of the planet carrier 288. The axial length of the contact between the journal pin 290 and the inner diameter of the planet carrier 288 is 1 over two (½) at each of the first aperture 294 and the second aperture 296. Thus, the length 1 of the interference fit is the sum of the axial length of contact between the journal pin 290 and each of the first aperture 294 and the second aperture 296.

When developing a gas turbine engine, the interplay among components can make it particularly difficult to select or to develop one component during engine design and prototype testing, especially, when some components are at different stages of completion and power and torque requirements become more demanding as compared to prior gearbox designs. The anticipated loading environment on the gearbox, in particular, planet gear, pin and carrier may dictate increased wall thickness, surface contact or material changes to accommodate high power cycles of the gearbox. Stress concentrations at joints, such as between pin and carrier, are challenging to determine and not unfrequently over or under-designed, which can result in a gearbox architecture having excessive weight or size, complexity, a drop in efficiency (torque-input/torque-output) or otherwise is not capable of operating over the desired number of cycles before parts need replacement or maintenance. The inventors seek to arrive at an improved gearbox design—carrier, planet pin design, in particular, by relating the loading environment of the gearbox to the type of interference fit needed to meet expectations for the engine architecture given its specific mission requirements.

Additionally, the inventors recognize the uncertainty on what design is needed to operate at high power requirements and this uncertainty can result in costly re-design. For example, one or more components may be nearly complete, yet one or more other components may be in an initial or a preliminary phase such that only one (or a few) design parameters is known. The inventors desire to arrive at design possibilities at an early stage of design, so that the downstream selection of candidate improved designs, given the tradeoffs, become more predictable. Heretofore, the process has sometimes been more ad hoc, selecting one design or another without knowing the impact when a concept is first taken into consideration. For example, and referring to FIG. 1, various aspects of the fan section 14 design (e.g., fan 38 design, the fan blades 40 design, etc.), the combustion section 26 design, the compressor section 21 design, the turbine section 27 design, etc., may not be known, but such components impact a gear ratio of the gearbox assembly 246 (FIG. 2) and the torque of the fan 38 and, thus, may influence the design of the gearbox assembly 246.

The design of the gearbox assembly 246 includes a design of the interference fit between the journal pin 290 and the planet carrier 288, for example, a design of a size of the journal pin 290 or a size of the first aperture 294 and the second aperture 296. The interference fit prevents rotation of the journal pin 290 with respect to the planet carrier 288. When the journal pin 290 is inserted into the planet carrier 288, the interference fit must be tight enough to withstand a torque on the journal pin 290 to prevent slippage between the journal pin 290 and the planet carrier 288. For example, the interference fit is defined by an interference ratio. The interference ratio is a ratio of a diametral interference $\delta$ to the outer diameter d of the journal pin 290. The diametral interference $\delta$ is the difference between the outer diameter d of the journal pin 290 and the inner diameter of the planet carrier 288 (e.g., the diameter of the first aperture 294 and the diameter of the second aperture 296). The interference ratio must be great enough to resist frictional torques on the journal pin 290 to prevent the slippage between the journal pin 290 and the planet carrier 288. Further, if the interference ratio is too great, plastic deformation of the journal pin 290 or the planet carrier 288 will occur.

The interference ratio includes a minimum interference ratio to withstand the torque on the journal pin 290 to prevent slippage between the journal pin 290 and the planet carrier 288. When the journal pin 290 is inserted into the first aperture 294 and the second aperture 296 of the planet carrier 288, an interference pressure exists due to deformation of the journal pin 290 and the planet carrier 288 for the interference fit. The interference pressure is a pressure at the contacting surface between the journal pin 290 and the planet carrier 288. The interference pressure is a function of the inner diameter $d_i$, the outer diameter d, the root diameter $d_0$, the diametral interference $\delta$, and a Young's modulus of the material of the journal pin 290 and the planet carrier 288. Friction at the contacting surface between the journal pin 290 and the planet carrier 288 is a function of the interference pressure, the outer diameter d, the coefficient of friction, and the length 1 of the interference fit. The torque transmitted between the planet carrier 288 and the journal pin 290 by the interference fit is a function of the friction at the contacting surface and the outer diameter d of the journal pin 290.

For no rotation of the journal pin 290, the torque must be greater than the torque loss of the journal pin 290. Thus, the minimum interference ratio is a function of the torque loss of the journal pin 290, the Young's modulus of the material of the journal pin 290 and the planet carrier 288, the coefficient of friction, the root diameter $d_0$, the inner diameter $d_i$, the outer diameter d, and the length 1 of the interference fit between the journal pin 290 and the planet carrier 288.

The inventors desire to narrow the range of configurations or combination of features that can yield favorable results given the constraints of the design, feasibility, manufacturing, certification requirements to arrive at a more favorable design better suited to handle the torques on the journal pin for different engine architectures, thereby improving efficiency in the conversion of kinetic energy in the fluid stream to mechanical energy in the turbine shaft. The inventors also desire to make selections earlier in the design selection process to avoid wasted time and effort. During the course of the evaluation of different embodiments as set forth herein, the inventors discovered, unexpectedly, that a good approximation of the minimum interference ratio may be made using only a relatively few engine parameters. This development is based on, among other things, the recognition that the minimum interference ratio between the journal pin 290 and the planet carrier 288 is related to the efficiency of a gearbox assembly. From this initial recognition and other developments that were the by-product of studying several different engine configurations that included a gearbox assembly (including the configurations disclosed herein), the inventors ultimately discovered that there exists a relationship between the torque of the fan 38 (being a function of a maximum power and a maximum speed of the fan 38) and the gearbox ratio that uniquely identify a finite and readily ascertainable (in view of this disclosure) number of advantageous embodiments suitable for a particular architecture that addresses the minimum interference ratio required to prevent slippage of the journal pin 290 with respect to the planet carrier 288. This relationship is referred to as the minimum interference ratio (IR), and is defined according to the following relationship (1) between torque T (Nm) of the fan 38 and the gearbox ratio $\lambda$;

$$\text{Interference Ratio } (IR) > \frac{0.01545T}{(0.0035T + 303.4)\left[\left(0.0035 - \frac{0.0018}{\lambda}\right)T + 193\right]^2} \quad (1)$$

The interference ratio includes a maximum interference ratio to prevent plastic deformation of the journal pin 290 or of the planet carrier 288, as detailed above. For example, if the interference ratio is too great, the interference pressure at the contact surface may cause plastic deformation of the journal pin 290 or of the planet carrier 288. The maximum interference ratio is a function of (a) the stresses at the interface of the journal pin 290 and the planet carrier 288 and (b) material properties (e.g., the yield strength of the material) of the journal pin 290 and the planet carrier 288. Thus, for journal pins 290 and for planet carriers 288 made of steel, the maximum interference ratio (IR) is defined according to the following relationship (2):

$$\text{Interference Ratio}(IR) < 5.7e-3 \quad (2)$$

As discussed further below, we have identified a range of the interference ratio that enables a journal pin 290 to be designed for a turbine engine 10 having a LP turbine 30 with more than three, four or five stages, a gearbox power rating greater than thirty-five kHP (35,000 HP), a fan bypass ratio greater than twelve (12), or an LP turbine 30 architecture utilizing a vaneless counter rotating turbine system. This relationship may be applicable over other turbine engine designs having an above thirty-five kHP (35,000 HP) power rating. Using this unique relationship, a gearbox assembly 246 design can be developed early in the design process that provides an interference fit between the journal pin 290 and the planet carrier 288 for preventing slippage and for preventing plastic deformation of the journal pin 290 and the planet carrier 288.

Table 1 describes exemplary embodiments 1 to 8 identifying the minimum interference ratio for various turbine engines. The embodiments 1 to 8 may be turbine engines having a LP turbine, such as the LP turbine 30 of FIG. 1, with more than three stages, a gearbox power rating greater than thirty-five kHP (35,000 HP), a fan bypass ratio greater than twelve (12:1), or an LP turbine architecture utilizing a vaneless counter rotating turbine system. Embodiments 1 to 8 may represent the turbine engine 10 described with respect to FIG. 1 and can be applied to the gearbox assembly 246 described in FIG. 2. In Table 1, the minimum interference ratio is determined based on the relationship (1) described above. A fan torque (Nm) is the torque T of the fan on the output (e.g., the ring gear 286 or the planet carrier 288). A gear ratio is the gear ratio λ of the gearbox assembly 246. In embodiments 1 to 8, the fan torque is between seventy thousand Newton meters (70,000 Nm) and ninety thousand Newton meters (90,000 Nm). The gear ratio is between three (3) and eight (8). The fan torque and the gear ratio are selected based on engine specifications and requirements for a particular engine. In some examples, the fan torque is between seventy-four thousand five hundred Newton meters (74,500 Nm) and eighty-eight thousand Newton meters (88,000 Nm). The gear ratio is between three (3) and five (5).

TABLE 1

| Embodiment | Fan Torque (Nm) | Gear Ratio | Minimum Interference Ratio |
|---|---|---|---|
| 1 | 70,000 | 3 | 1.3e−5 |
| 2 | 70,000 | 8 | 1.1e−5 |
| 3 | 90,000 | 3 | 1.1e−5 |
| 4 | 90,000 | 8 | 1.0e−5 |
| 5 | 74,500 | 3 | 1.2e−5 |
| 6 | 74,500 | 5 | 1.1e−5 |
| 7 | 88,000 | 3 | 1.1e−5 |
| 8 | 88,000 | 5 | 1.0e−5 |

Figure 4:
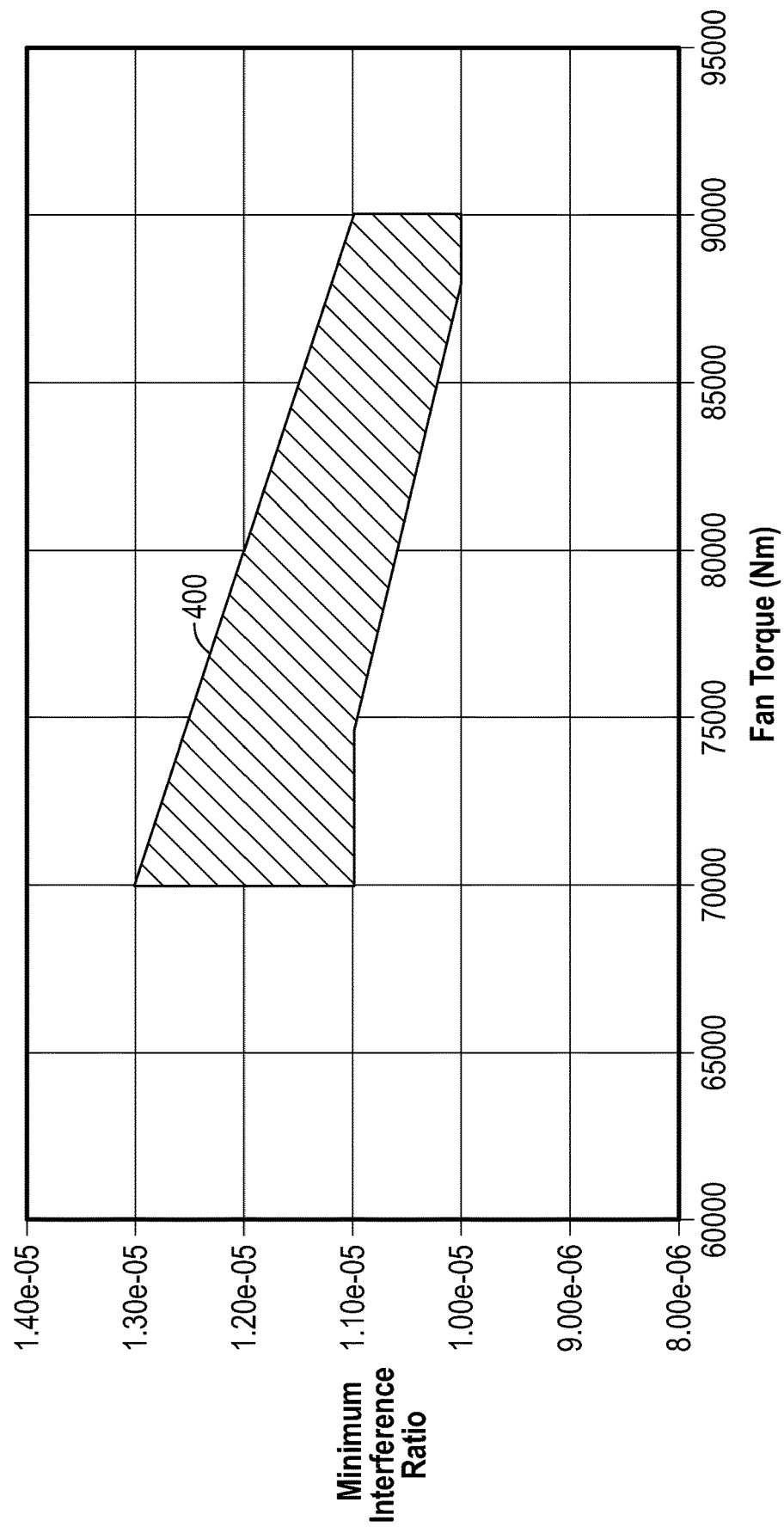
FIG. 4 is a graph illustrating a minimum interference ratio as a function of fan torque, according to embodiments of the present disclosure.

FIG. 4 represents, in graph form, the minimum interference ratio as a function of the fan torque. Table 1 and FIG. 4 show that the minimum interference ratio may be changed based on the fan torque of the ring gear, such as ring gear 286 of FIG. 1. As detailed above, the fan torque is a function of the fan power and the fan speed of the fan. An area 400 presents the boundaries of the minimum interference ratio as a function of the fan torque in which a particular gearbox assembly is designed. FIG. 4 shows the minimum interference ratio is between 1.0e-5 and 1.3e-5 for values of the fan torque between seventy thousand Newton meters (70,000 Nm) and ninety thousand Newton meters (90,000 Nm). Thus, the minimum interference ratio is 1.0e-5. In some examples, the minimum interference ratio is 1.1e-5. In some examples, the minimum interference ratio is 1.2e-5. In some examples, the minimum interference ratio is 1.3e-5. FIG. 4 shows as the fan torque increases, the minimum interference ratio decreases at a particular gear ratio due to an increase in engine size. For example, as engine size increases, the size of the planet gear, such as planet gear 284 of FIGS. 2 and 3, increases and the diameter of the journal pin, such as journal pin 290 of FIGS. 2 and 3, increases. The increase in the diameter of the journal pin increases the contact area between the journal pin and the planet carrier, such as planet carrier 288 of FIGS. 2 and 3. In this way, the length of the interference fit increases and so a lower interference ratio is needed to prevent slippage as compared to journal pins for smaller engines. FIG. 4 shows the minimum interference ratio decreases only slightly for different engine sizes, for example, from 1.3e-5 to 1.0e-5.

Figure 5:
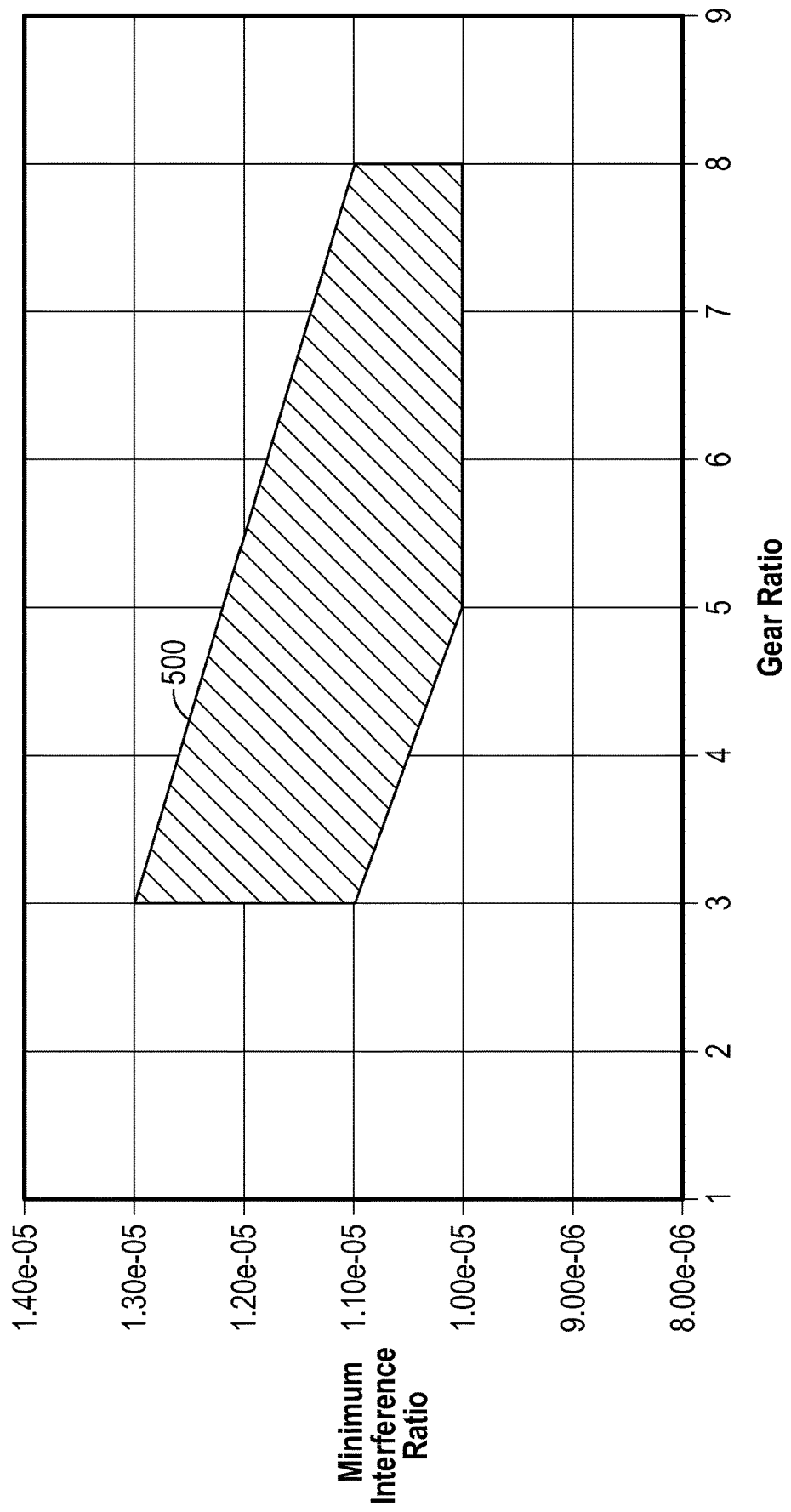
FIG. 5 is a graph illustrating a minimum interference ratio as a function of a gear ratio, according to embodiments of the present disclosure.

FIG. 5 represents, in graph form, the minimum interference ratio as a function of the gear ratio. Table 1 and FIG. 5 show that the minimum interference ratio may be changed based on the gear ratio of the gearbox assembly, such as gearbox assembly 246 of FIG. 2. An area 500 presents the boundaries of the minimum interference ratio as a function of the gear ratio in which a particular gearbox assembly is designed. FIG. 5 shows the minimum interference ratio is between 1.0e-5 and 1.3e-5 for values of the gear ratio between three (3) and eight (8). Thus, the minimum interference ratio is greater than or equal to 1.0e-5 and less than or equal to 1.3e-5, as detailed above. FIG. 5 shows as the gear ratio increases, the minimum interference ratio decreases due to an increase in gear sizes as the gear ratio increases between different turbine engines, as described above.

Figure 6:
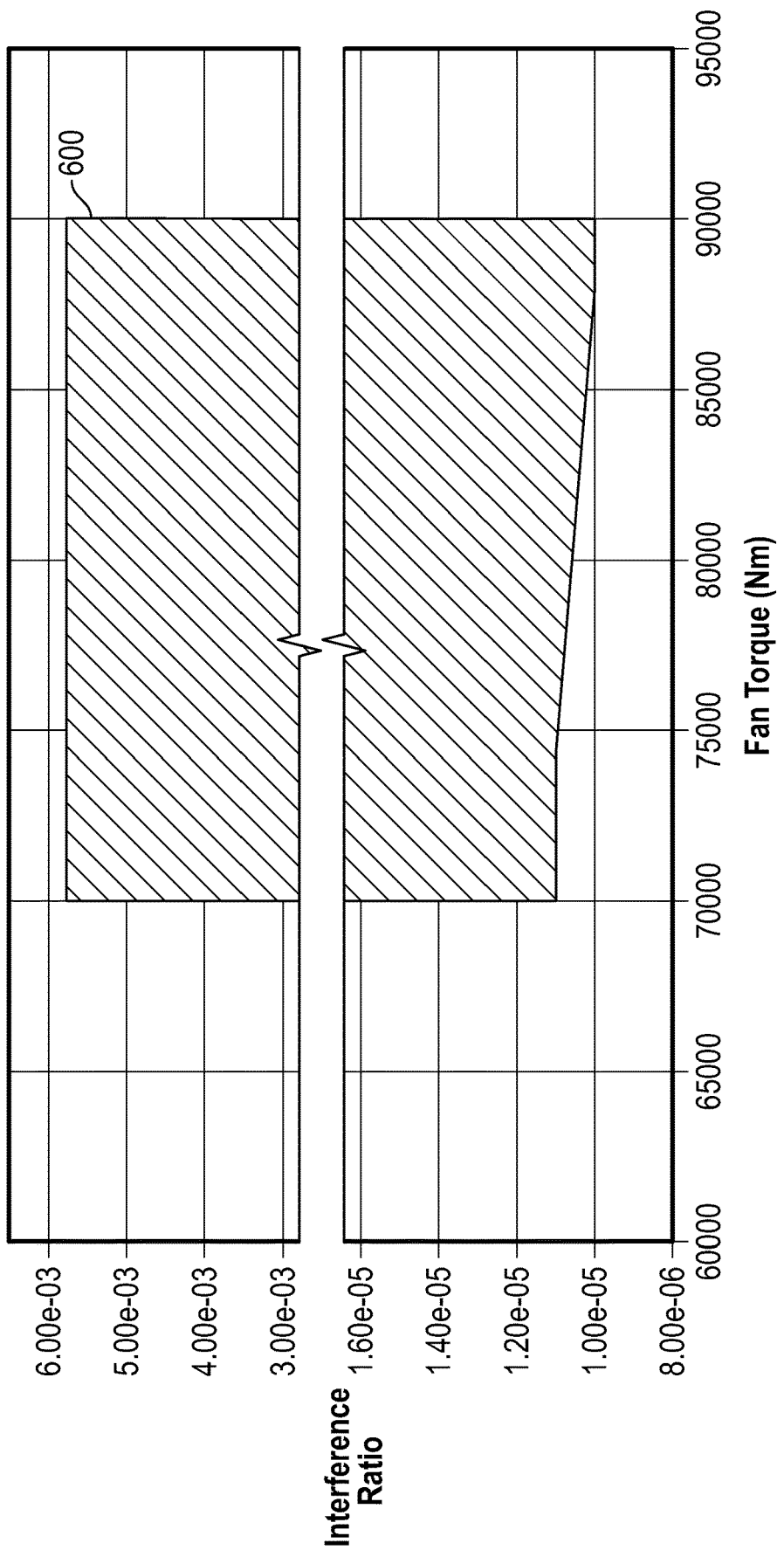
FIG. 6 is a graph illustrating an interference ratio as a function of fan torque, according to embodiments of the present disclosure.

FIG. 6 represents, in graph form, the interference ratio as a function of the fan torque. The scale of the y-axis of FIG. 6 changes for clarity and the graph includes broken lines at a location in which the scale of the y-axis changes. Table 1 and FIG. 6 show that the minimum interference ratio may be changed based on the fan torque of the ring gear, such as ring gear 286, as detailed above. The maximum interference ratio is constant for all values of the fan torque, as detailed above. For example, the maximum interference ratio is 5.7e-3. An area 600 presents the boundaries of the interference ratio as a function of the fan torque in which a particular gearbox assembly is designed. The area 600 includes broken lines at an area in which the scale of the y-axis changes, but the area 600 is continuous over an entirety of the range depicted. FIG. 6 shows the interference ratio is between 1.0e-5 and 5.7e-3 for values of the fan torque between seventy thousand Newton meters (70,000 Nm) and ninety thousand Newton meters (90,000 Nm). Thus, the interference ratio is greater than 1.0e-5 and less than 5.7e-3. In some examples, the interference ratio is greater than 1.1e-5 and less than 5.7e-3. In some examples, the interference ratio is greater than 1.2e-5 and less than 5.7e-3. In some examples, the interference ratio is greater than 1.3e-5 and less than 5.7e-3. FIG. 6 shows as the fan torque increases, the minimum interference ratio decreases at a particular gear ratio due to an increase in engine size, as detailed above, and the maximum interference ratio is constant for all values of fan torque.

Figure 7:
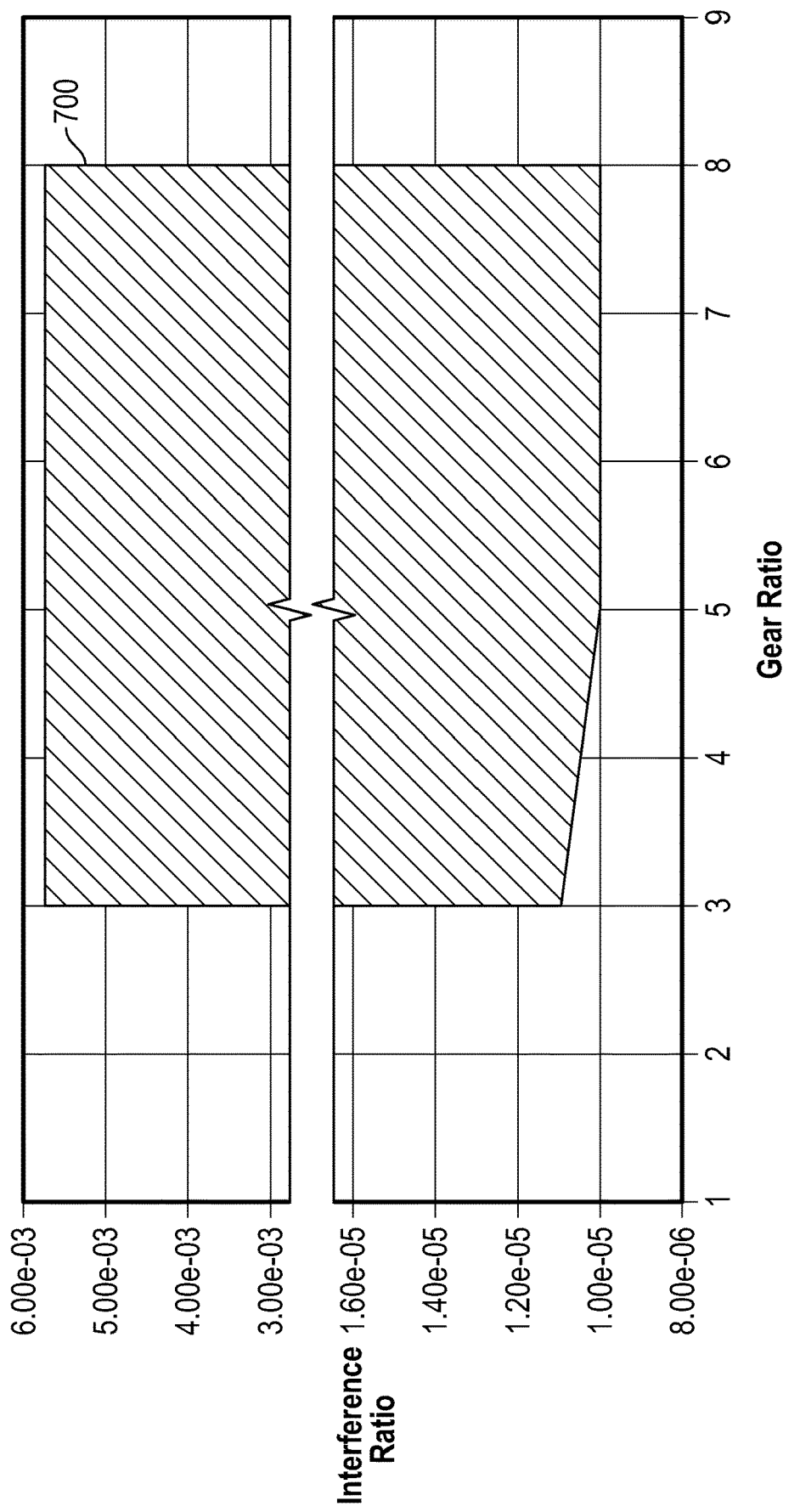
FIG. 7 is a graph illustrating an interference ratio as a function of a gear ratio, according to embodiments of the present disclosure.

FIG. 7 represents, in graph form, the interference ratio as a function of the gear ratio. The scale of the y-axis of FIG. 7 changes for clarity and the graph includes broken lines at a location in which the scale of the y-axis changes. Table 1 and FIG. 7 show that the minimum interference ratio may be changed based on the gear ratio of the gearbox assembly, such as gearbox assembly 246, as detailed above. The maximum interference ratio is constant for all values of the gear ratio, as detailed above. For example, the maximum interference ratio is 5.7e-3. An area 700 presents the boundaries of the interference ratio as a function of the gear ratio in which a particular gearbox assembly is designed. The area 700 includes broken lines at an area in which the scale of the y-axis changes, but the area 700 is continuous over an entirety of the range depicted. FIG. 7 shows the interference ratio is between 1.0e-5 and 5.7e-3 for values of the gear ratio between three (3) and eight (8). Thus, the interference ratio is greater than 1.0e-5 and less than 5.7e-3, as detailed above. FIG. 7 shows as the gear ratio increases, the minimum interference ratio decreases due to an increase in gear sizes as the gear ratio increases between different turbine engines, and the maximum interference ratio is constant for all gear ratios.

As detailed above, the embodiments of the present disclosure provide for a range of an interference ratio of the journal pin 290 of FIGS. 2 and 3, and the planet carrier 288 of FIGS. 2 and 3, to prevent slippage of the journal pin 290 within the planet carrier 288 and to prevent deformation of the journal pin 290 and the planet carrier 288 for a wide range of turbine engines. For example, the minimum interference ratio ensures slippage between the journal pin 290 and the planet carrier 288 does not occur. The minimum interference ratio is a function of the fan torque and/or the gear ratio for different turbine engines, as detailed above. The maximum interference ratio ensures that plastic deformation of the journal pin 290 or the planet carrier 288 does not occur for any turbine engine based on the stresses between the journal pin 290 and the planet carrier 288 and the material properties of the journal pin 290 and the planet carrier 288. Thus, the present disclosure provides for an interference fit of the journal pin 290 and the planet carrier 288 that prevents slippage of the journal pin 290 and prevents plastic deformation of the journal pin 290 and the planet carrier 288.

Further aspects are provided by the subject matter of the following clauses:

A gearbox assembly for a turbine engine that includes a drive shaft and a fan shaft. The gearbox assembly includes a first gear, a second gear, an output, and a journal pin. The first gear is coupled to the drive shaft. The second gear is supported by a planet carrier. The output is coupled to the fan shaft of the turbine engine. Torque is transferred from the drive shaft to the fan shaft through the gearbox assembly. The journal pin is inserted into the planet carrier. The second gear rotates about the journal pin. The coupling of the journal pin and the planet carrier is characterized by an interference ratio greater than a minimum interference ratio of 1.0e-5.

The gearbox assembly of the preceding clause, the first gear being a sun gear, the second gear being a plurality of planet gears, and the output being a ring gear.

The gearbox assembly of any preceding clause, the first gear being a sun gear, the second gear being a plurality of planet gears, and the output being the planet carrier.

The gearbox assembly of any preceding clause, the interference ratio being less than a maximum interference ratio of 5.7e-3.

The gearbox assembly of any preceding clause, the maximum interference ratio being a function of (a) stresses at an interface of the journal pin and the planet carrier and (b) material properties of the journal pin and the planet carrier.

The gearbox assembly of any preceding clause, the minimum interference ratio being between 1.0e-5 and 1.3e-5.

The gearbox assembly of any preceding clause, the minimum interference ratio being a function of a torque of the fan shaft and a gear ratio of the gearbox assembly.

The gearbox assembly of any preceding clause, the minimum interference ratio being greater than $$\frac{0.01545T}{(0.0035T+303.4)\left[\left(0.0035-\frac{0.0018}{\lambda}\right)T+193\right]^2}$$

T being the torque of the fan shaft in Newton meters, and $\lambda$ is the gear ratio of the gearbox assembly.

The gearbox assembly of any preceding clause, T being between seventy thousand Newton meters (70,000 Nm) and ninety thousand Newtown meters (90,000 Nm).

The gearbox assembly of any preceding clause, T being between seventy-four thousand five hundred Newton meters (74,500 Nm) and eighty-eight thousand Newton meters (88,000 Nm).

The gearbox assembly of any preceding clause, $\lambda$ being between three (3) and eight (8).

The gearbox assembly of any preceding clause, $\lambda$ being between three (3) and five (5).

A turbine engine including a fan section, a core turbine engine, and a gearbox assembly. The fan section includes a fan having a fan shaft. The core turbine engine includes a drive shaft. The gearbox assembly comprises a first gear, a second gear, an output, and a journal pin. The first gear is connected to the drive shaft. The second gear is supported by a planet carrier. The output is connected to the fan shaft. Torque is transferred from the drive shaft to the fan shaft through the gearbox assembly. The journal pin is inserted into the planet carrier, and the second gear rotates about the journal pin. A coupling of the journal pin and the planet carrier is characterized by an interference ratio greater than a minimum interference ratio of 1.0e-5.

The turbine engine of the preceding clause, the interference ratio being less than a maximum interference ratio of 5.7e-3.

The turbine engine of any preceding clause, the maximum interference ratio being a function of (a) stresses at an interface of the journal pin and the planet carrier and (b) material properties of the journal pin and the planet carrier.

The turbine engine of any preceding clause, the minimum interference ratio being between 1.0e-5 and 1.3e-5.

The turbine engine of any preceding clause, the minimum interference ratio being a function of a torque of the fan shaft and a gear ratio of the gearbox assembly.

The turbine engine of any preceding clause, the minimum interference ratio being greater than $$\frac{0.01545T}{(0.0035T+303.4)\left[\left(0.0035-\frac{0.0018}{\lambda}\right)T+193\right]^2}$$

T being the torque of the fan shaft in Newton meters, and $\lambda$ is the gear ratio of the gearbox assembly.

The turbine engine of any preceding clause, T being between seventy thousand Newton meters (70,000 Nm) and ninety thousand Newtown meters (90,000 Nm).

The turbine engine of any preceding clause, T being between seventy-four thousand five hundred Newton meters (74,500 Nm) and eighty-eight thousand Newton meters (88,000 Nm).

The turbine engine of any preceding clause, $\lambda$ being between three (3) and eight (8).

The turbine engine of any preceding clause, $\lambda$ being between three (3) and five (5).

The turbine engine of any preceding clause, the first gear being a sun gear, the second gear being a plurality of planet gears, and the output being a ring gear.

The turbine engine of any preceding clause, the first gear being a sun gear, the second gear being a plurality of planet gears, and the output being the planet carrier.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gearbox assembly for a turbine engine including a drive shaft and a fan shaft, the gearbox assembly comprising:

a first gear coupled to the drive shaft;
a second gear supported by a planet carrier;
an output coupled to the fan shaft of the turbine engine, wherein torque is transferred from the drive shaft to the fan shaft through the gearbox assembly; and
a journal pin inserted into the planet carrier, the second gear rotating about the journal pin,
wherein a coupling of the journal pin and the planet carrier is characterized by an interference ratio greater than a minimum interference ratio of 1.0e-5.

2. The gearbox assembly of claim 1, wherein the first gear is a sun gear, the second gear is a plurality of planet gears, and the output is a ring gear.

3. The gearbox assembly of claim 1, wherein the first gear is a sun gear, the second gear is a plurality of planet gears, and the output is the planet carrier.

4. The gearbox assembly of claim 1, wherein the interference ratio is less than a maximum interference ratio of 5.7e-3.

5. The gearbox assembly of claim 4, wherein the maximum interference ratio is a function of (a) stresses at an interface of the journal pin and the planet carrier and (b) material properties of the journal pin and the planet carrier.

6. The gearbox assembly of claim 1, wherein the minimum interference ratio is between 1.0e-5 and 1.3e-5.

7. The gearbox assembly of claim 1, wherein the minimum interference ratio is a function of a torque of the fan shaft and a gear ratio of the gearbox assembly.

8. The gearbox assembly of claim 7, wherein the minimum interference ratio is greater than $$\frac{0.01545T}{(0.0035T+303.4)\left[\left(0.0035-\frac{0.0018}{\lambda}\right)T+193\right]^2}$$

wherein T is the torque of the fan shaft in Newton meters, and $\lambda$ is the gear ratio of the gearbox assembly.

9. The gearbox assembly of claim 8, wherein T is between 70,000 Newton meters and 90,000 Newtown meters.

10. The gearbox assembly of claim 8, wherein T is between 74,500 Newton meters and 88,000 Newton meters.

11. The gearbox assembly of claim 8, wherein $\lambda$ is between 3 and 8.

12. The gearbox assembly of claim 8, wherein $\lambda$ is between 3 and 5.

13. A turbine engine comprising:
a fan section including a fan having a fan shaft;
a core turbine engine including a drive shaft; and
a gearbox assembly comprising:
a first gear connected to the drive shaft;
a second gear supported by a planet carrier;
an output connected to the fan shaft, wherein torque is transferred from the drive shaft to the fan shaft through the gearbox assembly; and
a journal pin inserted into the planet carrier, the second gear rotating about the journal pin,
wherein a coupling of the journal pin and the planet carrier is characterized by an interference ratio greater than a minimum interference ratio of 1.0e-5.

14. The turbine engine of claim 13, wherein the interference ratio is less than a maximum interference ratio of 5.7e-3.

15. The turbine engine of claim 14, wherein the maximum interference ratio is a function of (a) stresses at an interface of the journal pin and the planet carrier and (b) material properties of the journal pin and the planet carrier.

16. The turbine engine of claim 13, wherein the minimum interference ratio is between 1.0e-5 and 1.3e-5.

17. The turbine engine of claim 13, wherein the minimum interference ratio is a function of a torque of the fan shaft and a gear ratio of the gearbox assembly.

18. The turbine engine of claim 17, wherein the minimum interference ratio is greater than $$\frac{0.01545T}{(0.0035T+303.4)\left[\left(0.0035-\frac{0.0018}{\lambda}\right)T+193\right]^2}$$

wherein T is the torque of the fan shaft in Newton meters, and $\lambda$ is the gear ratio of the gearbox assembly.

19. The turbine engine of claim 18, wherein T is between 70,000 Newton meters and 90,000 Newtown meters.

20. The turbine engine of claim 18, wherein T is between 74,500 Newton meters and 88,000 Newton meters.

* * * * *